Patented Sept. 25, 1928.

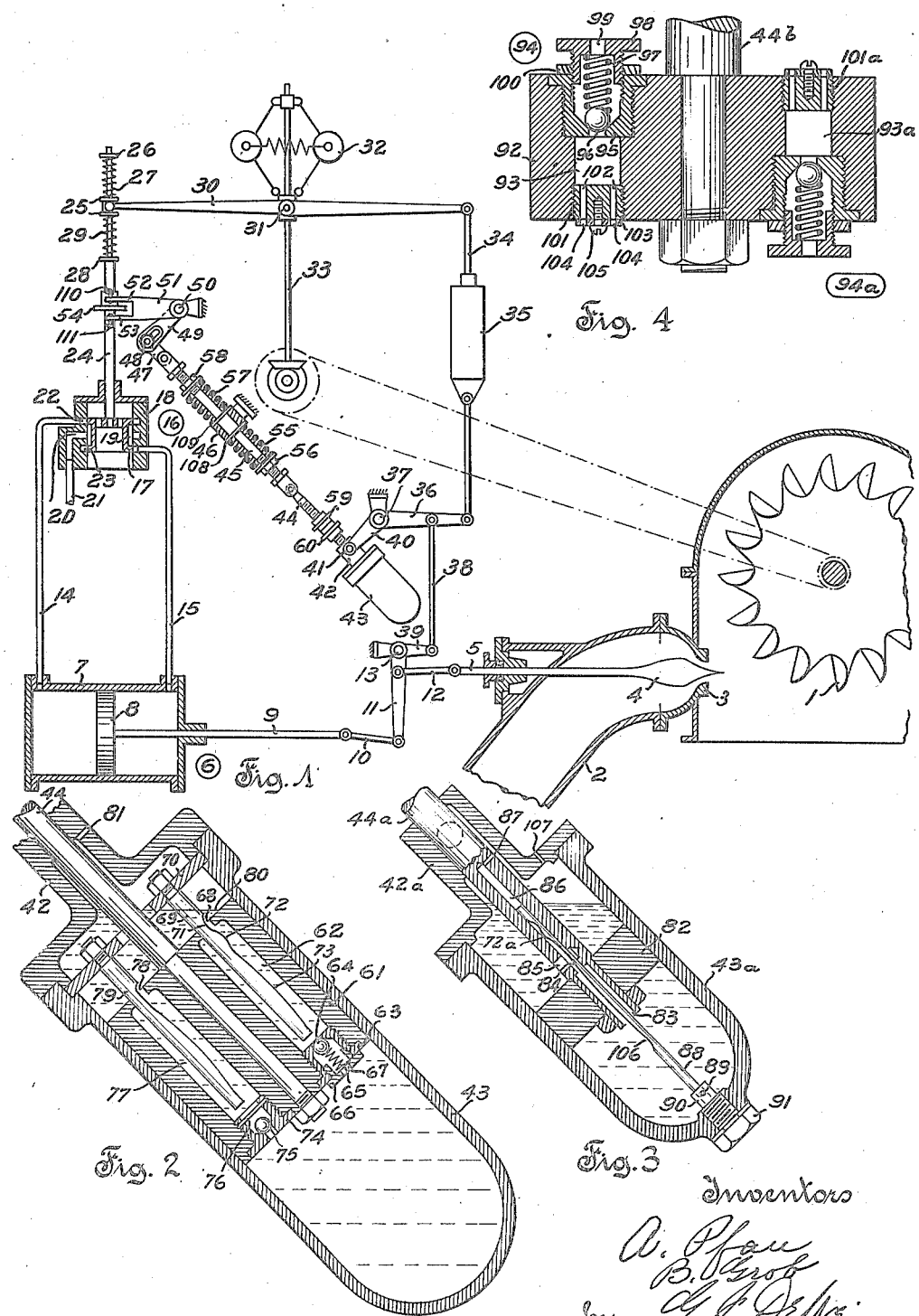

1,685,750

UNITED STATES PATENT OFFICE.

ARNOLD PFAU, OF MILWAUKEE, AND BENJAMIN GROB, OF WEST ALLIS, WISCONSIN, ASSIGNORS TO ALLIS-CHALMERS MANUFACTURING COMPANY, OF MILWAUKEE, WISCONSIN, A CORPORATION OF DELAWARE.

CONTROL SYSTEM.

Application filed December 26, 1924. Serial No. 758,277.

This invention relates in general to control systems for producing desired characteristics of motion of some element which it is desired to move. More particularly, it relates to control systems including a motive device whereby desired characteristics of motion of the motive device may be obtained, and, more specifically, to servo-motors. The invention may be applied in prime mover control systems, and more particularly in the control of the admission of operating fluid to prime movers. This invention embodies a specifically different means for performing the functions set forth in an application of Arnold Pfau, Serial No. 754,538, filed December 8, 1924, and other functions.

The invention will be described more particularly in connection with its application to hydraulic motors but it is to be understood that it may be applied to other forms of prime movers, and to other uses.

As was pointed out in the hereinbefore mentioned application, the flow of fluid in a conduit supplying a prime mover is usually controlled, primarily, by some form of mechanical means. In the case of a hydraulic turbine this means may be a butterfly valve, the gates or guide vanes of the turbine, or, in the case of an impulse wheel, the needle of a nozzle. The pressure variations in the conduit are a function of the change of flow through the conduit, both as to the amount of flow change and as to the rate of change of flow. The rate of motion of the means for controlling the admission of fluid is therefore a factor in determining the pressure variations in the conduit.

It has been found in practice that when the flow in a conduit is reduced from its maximum value, for example, to zero, that the pressure rise in the conduit is less than when the flow is reduced to zero from a value less than the maximum in a correspondingly reduced period of time. In order to prevent excessive pressure in the latter instance the time may of course be lengthened but if the admission controlling means is controlled by an automatic speed governor, for example, then the time for closing the admission controlling means from its fully open to fully closed position will usually be too long, resulting in too high a speed rise of the turbine before the fluid is cut off.

One of the objects of the invention is to provide means for obviating the before mentioned difficulties.

Another object is to provide means whereby the pressure variations in the conduit may be kept within desired limits under all ordinary conditions of operation of the admission controlling means.

A more specific object is the provision of means whereby the rate of motion of the admission controlling means may be predetermined by the position of such controlling means. A still more specific object is a provision of means whereby the rate of motion of the admission controlling means toward open position and the rate of motion toward closed position may be predetermined by the position of said controlling means, and if desired these rates of motion may be made different.

Still another object is the provision of means whereby the speed control characteristics of a governor-controlled prime mover may be predetermined, and more specifically, whereby the rapidity of response of the admission controlling means to the governor proper may be predetermined for any position of said controlling means.

A further object is the provision of means whereby the prime mover may be given predetermined starting, stopping or running characteristics, or two or more of such predetermined characteristics, to thereby adapt it for better and more efficient use in systems in which the prime mover is started and stopped semi-automatically or entirely automatically.

A still further object is the provision of means whereby an element which it is desired to move may be given a predetermined initial impulse to set it in motion and may then be caused to move at a predetermined desired rate, and more particularly at a rate dependent upon the position of the element which is moved or of the motive device which moves it.

Still another object is the provision of means whereby the rate of motion and also the degree of motion of an element which it is desired to move may be predetermined.

Still another object is the provision of means whereby the rate of motion-position characteristic of an element which it is desired to move may be predetermined and whereby the rate-of-motion values of the characteristic may be readily raised or lowered individually to alter the form of the characteristic, or as a whole without altering the form of the characteristics. Other objects will appear hereinafter as the description of the invention proceeds.

The novel features of the invention will appear from this specification and the accompanying drawing forming a part thereof and showing several embodiments of said invention, and all these novel features are intended to be pointed out in the claims.

In the drawings:

Fig. 1 is a diagrammatic showing of the manner in which the invention may be applied in connection with a hydraulic impulse wheel and governor therefor.

Fig. 2 is a sectional view of a detail.

Fig. 3 is a sectional view of a detail of modified form.

Fig. 4 is a sectional view of a detail of another modified form.

Referring to Fig. 1, a fragment of an impulse wheel 1 is more or less diagrammatically shown. Water may be supplied to the wheel 1 through a conduit 2 leading to a nozzle 3. The flow of water from the nozzle 3 is here shown as controlled by means of a needle 4 which may be reciprocated by means of a rod 5. The rod 5 may be operated by means of a servo-motor 6 here shown as including a cylinder 7 in which a piston 8 may operate. The piston is provided with a piston rod 9 to which may be pivotally connected a link 10 in turn pivotally connected to a lever 11. The lever 11 may be fastened to a shaft 13 swingable in stationary pivots. A connection between the lever 11 and the rod 5 may be made by means of a link 12 pivotally connected to these elements respectively. It is of course to be understood that the connection between the servo-motor 6 and the needle 4 is merely illustrative and that any other suitable form of connection may be utilized. Furthermore, as has been previously noted, the prime mover may be of any other form and the flow of operating fluid thereto may be controlled in any other desired manner. Fluid under pressure may be admitted to either end of cylinder 7 by means of pipes 14, 15 respectively. The admission of fluid under pressure to these pipes may be controlled by means of a regulating or distributing valve 16. The valve here shown includes a valve piston 17 adapted to operate in a valve cylinder 18. The valve piston 17 is provided with an annular channel 19 adapted to communicate, in the position of the valve shown in Fig. 1, with an annular inlet port 20. Fluid under pressure may be led to the inlet port 20 through a pipe 21 which may be connected to any suitable source of fluid under pressure (not shown). The valve cylinder 18 is provided with two annular ports 22, 23 which, in the position of the valve piston 17 as shown in Fig. 1, are closed by the valve piston. It is therefore clear that when the position of the parts is as shown no fluid will be admitted from port 20 to port 22 and to the pipe 14 with which it communicates, nor to port 23 and to the pipe 15 with which it communicates.

The valve piston 17 is provided with a stem 24 for operating the same. Slidably disposed around the valve stem 24 is a flanged sleeve 25. Above the sleeve 25 the stem 24 has a collar 26 fastened thereto and between this collar and the sleeve 25 is disposed a spring 27. Below the sleeve 25 the stem 24 has fastened thereto a collar 28 between which and the sleeve 25 is disposed a spring 29. A floating lever 30 having a floating pivot 31 associated with the slidable collar of the fly ball mechanism 32, has its left hand end, as viewed in Fig. 1, associated with the sleeve 25 and its right hand end has pivoted thereto a piston rod 34 of a compensating or dash pot device 35 which may be of any usual or desired form. The compensating device 35 may be suitably pivotally connected to a lever 36 which may be fastened to a shaft 37 swingable in stationary pivots. Pivotally connected with lever 36 is a link 38 which is in turn pivoted to a relay lever 39. The relay lever 39 may be fastened to the shaft 13.

Here shown as adapted to operate in unison with lever 36, is a lever 40 which is connected to a pivot 41 associated with a cover or head 42 of a dash pot 43. The dash pot is provided with a piston rod 44 pivotally connected to a connecting rod 45 slidable in a guide 46. The rod 45 is pivotally connected at its other end to a link 47 which is in turn pivotally connected to a pin 48. The pin 48 may be fixed in any desired manner to a lever 49, and in any desired position in a slot in said lever. The lever 49 may be fastened to a shaft 50 swingable in a stationary bearing. Operable in unison with lever 49 is a bifurcated lever 51 providing a finger or stop 52 and a similar finger or stop 53. Between these fingers is disposed a collar 54 which is rigidly associated with the valve stem 24. The fingers 52, 53 may be provided with adjustable abutments here shown as screws 110, 111 against which collar 54 may abut, the screws enabling adjustment of the clearance between the collar and fingers. When the piston 8 of the servo-motor is stationary and the regulating valve 16 is in its neutral position as shown, the fingers 52, 53 are held in the position shown with respect to collar 54 by means which will be now described. The rod 45 has an enlarged portion within the guide 46 forming shoulders against which loose washers 108, 109 are adapted to bear. A spring 55 is disposed about the rod 45 and between the washer 108 and a nut 56 threaded upon the rod 45. Another spring 57 is similarly disposed about the rod 45 and between the washer 109 and a nut 58 also threaded upon rod 45. Movement of rod 45 in one or the other direction will thus compress either spring 55 or spring 57. Both springs 55, 57, are preferably under pre-compression in the neutral position as shown.

For a purpose which will be hereinafter set forth the outer end of piston rod 44 is threaded to receive a pair of nuts 59, 60 which may be mutually locked to the rod 44 in any desired position.

Referring now to Fig. 2, the dash pot 43 and a piston 61 operable therein are here shown in section. The piston 61 is provided with a longitudinal passage 62 in one end of which is threaded a valve seat member 63 adapted to receive a ball 64 acting as a check valve. This ball is resiliently held to its seat by means of a spring 65 which is in turn held by a cap 66 here shown as threaded into the member 63. The cap 66 is provided with a hole 67. The other end of the passage 62 communicates with the other end of the dash pot through a hole 68. A needle 69 is adapted to pass through hole 68 and into the passage 62. The needle 69 may be supported in any suitable manner as by means of a plate 70 which is here shown as clamped between the dash pot and the head 42. The needle 69 may be initially round and of the same diameter as the hole 68. In order to provide for the passage of fluid from one side of the dash pot to the other through the passage 62, the needle 69 may be filed or machined at various points in its length, or throughout its length, a definite predetermined amount to provide for example, a depression 71 and other depressions, abrupt or gradual, to form for example, a hump 72 and another hump 73.

The piston 61 is here shown as provided with another longitudinal passage 77 into one end of which is threaded the valve seat member 74 with which cooperates a ball 75 acting as a check valve. It will be noted that the ball 75 checks the flow of fluid in the passage 77 in a direction opposite from that that the ball 64 checks the flow of fluid in the passage 62. The ball 75 may be prevented from entirely leaving the valve seat member 74 by means of a cross pin 76. The other end of the passage 77 communicates with the other end of the dash pot through an opening 78. A needle 79 is adapted to pass through the opening 78 and in the instance shown it is filed or machined away in a manner similar to that shown in connection with needle 69 except that a hump such as 72 has been omitted. The needle 79 may be also fastened to plate 70. It is to be understood that the form of needles 69, 79 may be anything that may be desired so that the cross sectional areas of the effective openings 68, 78 in any relative position of piston 61 and the needles may produce the desired effects.

The dash pot 43 may be filled with oil or other suitable fluid to a level here indicated as 80. If desired an opening 81 may be provided at a suitable place in the head 42 to permit free exchange as between the air above the oil level 80 and the atmosphere.

Referring now to Fig. 3 this illustrates a modified form of dash pot construction, and in which only a single needle is utilized. The dash pot $43_a$ and piston rod $44_a$ may be related to the elements of Fig. 1 in the same manner as dash pot 43 and rod 44. A piston 82 is operable in dash pot $43_a$ and is provided with a longitudinal passage 83, formed in rod $44_a$, communicating through an opening 84 and a transverse hole 85 with the other end of the dash pot. The passage 83 is here shown as extending still further longitudinally, but of smaller diameter, to form a hole 86 adapted to receive a needle 88. The needle 88 may be fastened by a pin 89 to a portion of a threaded plug 90 which is here shown as extending through the lower end of dash pot $43_a$ and provided at the lower end with a head 91 through which it may be turned and set up against the dash pot. The end of hole 86 may communicate with the air above the oil level in the dash pot through a transverse hole 87 through the piston rod $44_a$. An air opening 107 may also be provided in and through the head $42_a$ of the dash pot.

Referring now to Fig. 4, this shows a modified form of piston, in section, which may be used to replace the pistons shown in Figs. 2 and 3, and which is adapted to be used without the needles hereinbefore described. The piston rod $44_b$ corresponds to the piston rod 44 of Fig. 1 and is adapted to carry a piston 92. The piston 92 may be provided with a longitudinal passage 93 in one end of which is disposed a valve 94 comprising a valve seat member 95 threaded into the passage. A ball 96 is adapted to cooperate with the valve seat and is resiliently pressed to the closed position by means of a spring 97. The compression of the spring 97 may be increased or decreased by means of a cap 98 here shown as threaded into the valve seat member 95 and the cap may be locked in position by means of a nut 100. To permit exit of fluid through the valve, the cap 98 is provided with a hole 99. At the other end of passage 93 is provided a plug 101 which may have one or more longitudinal holes 102. The cross sectional area of the passage afforded by these holes may be varied by means of a plate 103 provided with holes 104 which may be caused to register more or less with the holes 102. For this purpose the plate 103 may be rotatable about a screw 105 threaded into plug 101, and when the proper adjustment has been made may be held in place by the same screw.

The piston 92 may also be provided with another longitudinal passage 93$_a$ into one end of which may be threaded a valve 94$_a$ similar to valve 94. The valve 94$_a$ is disposed on the side of the piston opposite from that in which valve 93 is disposed. In a similar manner the other end of passage 93$_a$ may be provided with a plug 101$_a$ along with the adjustable means for varying the cross section of the openings therein, as has been described in connection with plug 101.

The operation of the system will be first described in connection with the form of dash pot device shown in Fig. 3. Assuming the position of the parts to be as shown in Fig. 1, that is, the wheel 1 is operating, the nozzle being in about the half open position and the governor being deadbeat, that is, the valve piston 17 covers both the ports 22, 23, no fluid under pressure is then admitted to either end of cylinder 7 and the needle 4 is stationary. If now a change in speed occurs, for example, a rise in speed, the fly balls 32 will lift the floating pivot 31 and the floating lever 30 will lift the valve stem 24, the force being transmitted through sleeve 25 and spring 27. The maximum amount of initial lift of the valve stem 24 is limited by the finger 52. Any tendency for the fly balls to lift the stem further is checked by the spring 55 which spring is stronger than spring 27 and if there is such tendency the spring 27 will be compressed. When valve 17 is lifted, fluid under pressure is admitted from port 20 to port 22 and pipe 14 thereby applying an initial force to start the needle 4 to move in the closing direction. As soon as the servo-motor moves, and consequently the needle, the lever 40 will be swung in a counter-clockwise direction thereby moving the dash pot 43$_a$ in a downward direction as viewed in Fig. 3. By reason of the partial vacuum formed below piston 82 by this movement of the dash pot, fluid above said piston will enter openings 85, 84 and pass through passage 83 to the lower side of the piston. The rate of flow of fluid through the bypass in the piston will determine the amount of pull exerted in a downward direction on the rod 45 and therefore the amount to which spring 57 will be compressed. As a result of the downward motion given to rod 45 the control finger 52 will be moved downwardly at a rate and to a position which, as will be plain, is determined by the cross sectional area of the opening 84. The position of finger 52 of course determines the amount of lift of the valve piston 17 and after the servo-motor has been given an initial impulse, the lift of valve 17 will be reduced when the finger 52 has been moved downwardly by reason of a restriction of the opening 84. The servo-motor and consequently the needle 4 therefor will continue their motion at a rate dependent upon the cross sectional area of the opening 84, as long as the fly balls 32 tend to lift the valve stem 24. The compensating device 35 operates upon the floating lever 30, by reason of the motion of the servo-motor, in an old and well known manner. When the nozzle has been sufficiently moved toward closed position to compensate for the assumed speed increase, the regulating valve will be returned to its neutral position by the fly balls and the servo-motor will stop moving and the spring 57 will return the control fingers 52, 53 to the neutral position as shown. The pre-compression of spring 57 enables it to positively cause return of the rod 45 to neutral position against any resistance caused by dash pot 43$_a$ when the latter is at rest. If the fly balls 32 continue to exert a lifting action on the valve stem 24, which would occur for example, if the load had been entirely removed from the prime mover or the speed was still too high, the needle 4 would continue to move to the closed position. As the dash pot 43$_a$, therefore, continues to move in a downward direction the cross sectional area of the opening 84 will, in the instance shown, be gradually increased by reason of the fact that the needle 88 will be withdrawn from the hole 86 in the piston and because as it is so withdrawn the opening 84 will be gradually enlarged by reason of the reduced size of the cross sectional area of needle 88. The compression of spring 57 will therefore be lessened and control finger 52 will swing in a clockwise direction to a new position in which it permits a greater lift of valve piston 17 and therefore a higher rate of motion of the servo-motor. As the motion continues toward the closed position the opening 84 will be restricted by reason of the hump 72$_a$ and the rate of motion of the needle or other admission controlling means will therefore be reduced, so that if desired, as the last part of the flow of operating fluid to the prime mover is clipped off the rate of motion of the needle may be made very slow. As the needle moves still further to the fully seated position the force on the same may if desired be increased by a depression in the needle which thus serves to increase the area of opening 84, thereby firmly seating the needle. If operating fluid is to be again admitted to the prime mover the valve piston 17 will be depressed in any suitable manner so that fluid under pressure will be admitted from port 20 to port 23 and pipe 15 thereby forcing piston 8 to the left and the needle 4 in the opening direction. When this occurs the lever 40 will be moved in a clockwise direction and the amount of force tending to move the piston rod 44 outwardly will be again determined by the opening 84 for each successive position of the servo-motor. In the opening direction the spring 55 will be compressed an amount dependent upon the force applied to rod 44 and the finger 53 will move the regulating valve piston 17 toward neutral position a predetermined amount. If curves were plotted with say the rate of motion of the needle as ordinates and the position of the needle as abscissæ, a characteristic curve would be obtained if we start, for example, with the needle in fully open position and cause it to move to the fully closed position. For the sake of brevity characteristics of this kind will be termed "rate of motion-position" characteristics. As far as the needle 88 is concerned, the servo-motor will move from its fully closed position to the fully open position with a rate of motion-position characteristic which is the same as its characteristic when it moves from the fully open to the fully closed position. It is clear however that if the spring 55 is made stronger than spring 57 for example, or the compression thereof is increased by screwing up the nut 56, the amount of force necessary to move the rod 44 in the upward direction which corresponds to the opening movement of the servo-motor, may be made greater than the amount of force necessary to move it in a downward direction. Consequently the rate of motion of the servo-motor for any position thereof will be, if desired, faster in the opening direction than it will be in the closing direction. This is of course true no matter what the shape of the needle 88 may be, and will be true if the bypass in the piston 82 were a simple invariable opening. It is therefore evident that by a combination of a needle of desired form and by suitable adjustment of springs 55, 57 the interrelated characteristics of closing and opening motion of the servo-motor may be made anything that may be desired.

By screwing out the plug 90 the needle 88 may be readily removed and either modified or replaced by some other form of needle if desired.

If it is important that the rate of motion-position characteristic of the servo-motor shall be considerably different for the opening and closing directions of movement, the form of dash pot and piston shown in Fig. 2 may be utilized. It will be evident from a consideration of this form when the dash pot 43 is moved in an upward direction, which corresponds in the instance shown with the opening movement of the servo-motor, the fluid beneath the piston 61 will be put under pressure thereby lifting the ball 75 and permitting fluid to flow through passage 77 and out of opening 78. As the dash pot 43 continues to move the needle 79 will be withdrawn from passage 77 and if said needle has the form shown in this figure the opening 78 will be gradually restricted so that the rate of motion of the servo-motor toward the open position will be gradually reduced until the needle is withdrawn still further at which time the cross sectional area of the opening 78 will be again increased thereby again increasing the rate of motion. Meanwhile no fluid has been permitted to flow through the passage 62 for the reason that the check valve 64 is pressed to its closed position. If the servo-motor moves towards the open position the dash pot 43 will be moved downwardly with respect to piston 61 and by reason of the partial vacuum formed beneath said piston, fluid will flow through opening 68 through passage 62 and through the check valve 64 which is now open and will leave through the opening 67. It will be clear that the rate of motion from point to point in the position of the servo-motor will be determined by the opening 68 which will be varied by the needle 69 as the latter enters the passage 62. In this modification also the characteristics may be raised or lowered as a whole by suitable adjustment of springs 55, 57.

If the type of piston shown in Fig. 4 is used the operation will be as follows. Assume that the servo-motor has begun to move in the closing direction and a partial vacuum is therefore formed beneath piston 92. Fluid will tend to enter through the holes in plug 101$_a$ and when the pressure is sufficient, dependent upon the adjustment of the spring in valve 94$_a$, the latter valve will be open a predetermined extent. The amount of force pulling the piston rod 44$_b$ downwardly will therefore depend not only on the adjustment of valve 94$_a$ but also upon the cross sectional area of the openings in plug 101$_a$. When the servo-motor operates toward the open position the fluid below the piston will be compressed and when a predetermined pressure is reached the valve 94 will in like manner open, and, along with the openings in plug 101, will determine the amount of force pushing rod 44 upwardly and therefore the rate of motion of the servo-motor in the opening direction.

In general, if it is desired that the initial impulse given the servo-motor by reason of for example, the lift of collar 54 on the valve stem 24 against control finger 52, or its drop against finger 53, be controlled, the duration of this impulse may be decreased by shifting the pin 48 radially toward the shaft 50 thereby shortening the effective lever 49 upon which the rod 45 acts. If this lever is shorter, then a smaller motion of the servo-motor in the closing direction, for example, will serve to move the control finger 52 an amount the same as before the adjustment. The servo-motor will therefore move a smaller distance under the influence of the maximum initial impulse. Any effect that adjustment of the lever 49 may have on the general rate-of-motion characteristic of the servo-motor, may be compensated for, if desired, by suitable adjustment of springs 55, 57 or of the various dash pot adjustments. If it is desired to change the amount of the maximum initial impulse on the servo-motor in the closing direction the screw 110 may be adjusted. For the opening direction, the screw 111 may be adjusted.

The system operates as a load or power limiting device as follows. When load comes on the prime mover the speed drops and the regulating valve is opened to cause the servo-motor to open the nozzle. Opening movement of the nozzle causes the head 42 of the dash pot to move toward and into contact with nut 60. Further movement returns the regulating valve to neutral position thereby stopping the needle movement. It is clear that the amount that the nozzle may open is limited by the position of the nut 60.

It should be understood that it is not desired to limit the invention to the exact details of construction shown and described, for obvious modifications may occur to a person skilled in the art.

It is claimed and desired to secure by Letters Patent:

1. In a control system, a device to be moved, means for transmitting force to move said device, means for operating said force transmitting means, and means including means positioned in accordance with said operating means for causing said operating means to apply a predetermined maximum impulse to said transmitting means and to then cause the latter means to move at a rate dependent upon the position of said latter means.

2. In a control system, a device to be moved, a servo-motor, means for transmitting to said device the action of said servo-motor operatively related to the latter, and means including means positioned in accordance with said servo-motor whereby said servo-motor is caused to apply a predetermined maximum impulse to said transmitting means and is then caused to move said latter means at a rate dependent upon the position of said latter means.

3. In a prime mover control system, means for controlling the admission of operating fluid to said prime mover, means for operating said admission controlling means, and means whereby said operating means is caused to apply a predetermined maximum impulse to said admission controlling means and then to move said admission controlling means at a rate dependent upon the position of said latter means.

4. In a prime mover control system, means for controlling the admission of operating fluid to said prime mover, means for operating said admission controlling means, means responsive to the speed of said prime mover for controlling said operating means, and means whereby said operating means is caused to apply a predetermined maximum impulse to said admission controlling means and to then move said admission controlling means at a rate dependent upon the position of said latter means.

5. In a prime mover control system, means for controlling the admission of operating fluid to said prime mover, means for operating said admission controlling means, adjustable means for controlling said operating means, different degrees of adjustment causing said operating means to move at different rates and means for permitting a predetermined maximum initial adjustment and for limiting the degree of adjustment dependent upon the position of said admission controlling means when said latter means begins to move.

6. In a prime mover control system, means for controlling the admission of operating fluid to said prime mover, means for operating said admission controlling means, adjustable means for controlling said operating means, different degrees of adjustment causing said operating means to move at different rates, means responsive to the speed of said prime mover for controlling said adjustable means, and means for permitting a predetermined maximum initial adjustment and for limiting the degree of adjustment dependent upon the position of said admission controlling means when said latter means begins to move.

7. In a prime mover control system, means for controlling the admission of operating fluid to said prime mover, a servo-motor for operating said admission controlling means, a regulating valve for controlling said servo-motor, different degrees of adjustment of said valve causing said operating means to move at different rates, and means for permitting a predetermined maximum initial adjustment and for limiting the degree of adjustment dependent upon the position of said admission controlling means when said latter means begins to move.

8. In a prime mover control system, means for controlling the admission of operating fluid to said prime mover, a servo-motor for operating said admission controlling means, a regulating valve for controlling said servo-motor, different degrees of adjustment of said valve causing said operating means to move at different rates, means responsive to the speed of said prime mover for controlling the adjustment of said regulating valve, and means for permitting a predetermined maximum initial adjustment and for limiting the degree of adjustment dependent upon the position of said admission controlling means when said latter means begins to move.

9. In a prime mover control system, means for controlling the admission of operating fluid to said prime mover, a servo-motor for operating said admission controlling means, a regulating valve for controlling said servo-motor, different degrees of adjustment of said valve causing said operating means to move at different rates, and means including a dash pot operatively related to said regulating valve and dependent upon the position of said admission controlling means for limiting the degree of said adjustment.

10. In a prime mover control system, means for controlling the admission of operating fluid to said prime mover, a servo-motor for operating said admission controlling means, a regulating valve for controlling said servo-motor, different degrees of adjustment of said valve causing said operating means to move at different rates, means responsive to the speed of said prime mover for controlling the adjustment of said regulating valve, and means including a dash pot operatively related to said regulating valve and dependent upon the position of said admission controlling means for limiting the degree of said adjustment.

11. In a prime mover control system, means for controlling the admission of operating fluid to said prime mover, means for operating said admission controlling means, and means including a dash pot whereby said operating means may be caused to move said admission controlling means from closed to open position with a predetermined rate of motion-position characteristic and from open to closed position with a different predetermined rate of motion-position characteristic.

12. In a prime mover control system, means for controlling the admission of operating fluid to said prime mover, means for operating said admission controlling means, means responsive to the speed of said prime mover for controlling said operating means, and means including a dash pot whereby said operating means may be caused to move said admission controlling means from closed to open position with a predetermined rate of motion-position characteristic and from open to closed position with a different predetermined rate of motion-position characteristic.

13. In a control system, a servo-motor, a regulating valve therefor, different degrees of adjustment of said valve from its neutral position causing said servo-motor to move at different rates, a stop for permitting to a predetermined maximum extent the adjustment of said valve in one direction from its neutral position, means positioned in accordance with the position of said servo-motor, a connection between said last named means and said stop, and a dash pot having an adjustable bypass, interposed in said connection whereby said stop is moved toward the neutral position of said valve when said servo-motor moves at a predetermined rate.

14. In a control system, a servo-motor, a regulating valve therefor, different degrees of adjustment of said valve from its neutral position causing said servo-motor to move at different rates, a stop for permitting to a predetermined maximum extent the adjustment of said valve in one direction from its neutral position, means positioned in accordance with the position of said servo-motor, a connection between said last named means and said stop, a dash pot interposed in said connection, a bypass for said dash pot, and means whereby the area of said bypass is made dependent upon the position of said servo-motor.

15. In a control system, a servo-motor, a regulating valve therefor, different degrees of adjustment of said valve from its neutral position causing said servo-motor to move at different rates, a stop for permitting to a predetermined maximum extent the adjustment of said valve in one direction from its neutral position, means positioned in accordance with the position of said servo-motor, a connection between said last named means and said stop, and means for returning said stop to its original position when said servo-motor stops moving.

16. In a control system, a servo-motor, a regulating valve therefor, different degrees of adjustment of said valve from its neutral position causing said servo-motor to move at different rates, a stop for permitting to a predetermined maximum extent the adjustment of said valve in one direction from its neutral position, means positioned in accordance with the position of said servo-motor, a connection between said last named means and said stop, a dash pot interposed in said connection, a bypass for said dash pot, whereby said stop is moved by said connection toward the neutral position of said valve when said servo-motor moves, and means for returning said stop to its original position when said servo-motor stops moving.

17. In a control system, a servo-motor, a regulating valve therefor, different degrees of adjustment of said valve in either direction from its neutral position causing said servo-motor to move at different rates in its respective corresponding directions, a pair of stops for respectively permitting to a predetermined maximum extent adjustment of said valve in either direction from its neutral position, means positioned in accordance with the position of said servo-motor, a connection between said last named means and said stops, and a dash pot, having an adjustable bypass, interposed in said connection, whereby one or the other of said stops is moved by said connection toward the neutral position of said valve depending upon the direction of movement of said servo-motor.

18. In a control system, a servo-motor, a regulating valve therefor, different degrees of adjustment of said valve in either direction from its neutral position causing said servo-motor to move at different rates in its respective corresponding directions, a pair of stops for respectively permitting to a predetermined maximum extent adjustment of said valve in either direction from its neutral position, means positioned in accordance with the position of said servo-motor, a connection between said last named means and said stops, a dash pot interposed in said connection, a pair of bypasses for said dash pot, and means for closing one or the other of said bypasses depending upon the direction of movement of said servo-motor.

19. In a control system, a servo-motor, a regulating valve therefor, different degrees of adjustment of said valve in either direction from its neutral position causing said servo-motor to move at different rates in its respective corresponding directions, a pair of stops for respectively permitting to a predetermined maximum extent adjustment of said valve in either direction from its neutral position, means positioned in accordance with the position of said servo-motor, a connection between said last named means and said stops, a dash pot, having an adjustable bypass, interposed in said connection, whereby one or the other of said stops is moved by said connection toward the neutral position of said valve depending upon the direction of movement of said servo-motor, and means for returning the stop which has been thus moved to its original position when said servo-motor stops moving.

20. In a control system, a servo-motor, a regulating valve therefor, different degrees of adjustment of said valve in either direction from its neutral position causing said servo-motor to move at different rates in its respective corresponding directions, a pair of stops for respectively permitting to a predetermined maximum extent adjustment of said valve in either direction from its neutral position, means positioned in accordance with the position of said servo-motor, a connection between said last named means and said stop, a dash pot interposed in said connection, a pair of bypasses for said dash pot, means for closing one or the other of said bypasses depending upon the direction of movement of said servo-motor, whereby one or the other of said stops is moved toward the neutral position of said valve depending upon the direction of movement of said servo-motor, whereby one or the other of said stops is moved toward the neutral position of said valve depending upon the direction of movement of said servo-motor, and means for returning the stop which has been thus moved to its original position when said servo-motor stops moving.

21. In a control system, a servo-motor, a regulating valve therefor, different degrees of adjustment of said valve from its neutral position causing said servo-motor to move at different rates, a stop for permitting to a predetermined maximum extent the adjustment of said valve in one direction from its neutral position, a member positioned in accordance with the position of said servo-motor, a connection between said member and said stop, and a dash pot interposed in said connection.

22. In a control system, a servo-motor, a regulating valve therefor, and means positioned in accordance with the position of said servo-motor and operatively related to said regulating valve, whereby the rate of motion and the degree of motion of said servo-motor may be predetermined.

23. In a prime mover control system, means for controlling the admission of operating fluid to said prime mover, means for operating said admission controlling means, means whereby said operating means may be caused to move said admission controlling means with a predetermined rate of motion-position characteristic, and means depending on the position of said admission controlling means for limiting the degree of motion of said latter means toward open position.

24. In a control system, a servo-motor, means for transmitting the action of said servo-motor operatively related to the latter, means whereby said servo-motor is caused to apply a predetermined maximum impulse to said transmitting means and is then caused to move the latter means at a predetermined rate, and means for adjusting the duration of said impulse.

In testimony whereof, the signatures of the inventors are affixed hereto.

ARNOLD PFAU.
BENJAMIN GROB.